US 6,620,536 B1

(12) United States Patent
Strobel et al.

(10) Patent No.: US 6,620,536 B1
(45) Date of Patent: Sep. 16, 2003

(54) FUEL CELL SYSTEM

(75) Inventors: Barbara Strobel, Dornstadt (DE);
Marco Lippert, Bibertal-Buehl (DE);
Alexandra Hassert, Wangen (DE);
Martin Schuessler, Ulm (DE)

(73) Assignee: Ballard Power Systems AG,
Kirchheim/Teck-Nabern (DE)

( * ) Notice: Subject to any disclaimer, the term of this patent is extended or adjusted under 35 U.S.C. 154(b) by 0 days.

(21) Appl. No.: 09/743,984

(22) PCT Filed: Jun. 23, 1999

(86) PCT No.: PCT/EP99/04353

§ 371 (c)(1),
(2), (4) Date: Mar. 9, 2001

(87) PCT Pub. No.: WO00/04600

PCT Pub. Date: Jan. 27, 2000

(30) Foreign Application Priority Data

Jul. 18, 1998 (DE) ......................................... 198 32 389

(51) Int. Cl.[7] ................................................ H01M 8/18
(52) U.S. Cl. .............................. 429/19; 429/20; 429/22; 429/24; 429/26
(58) Field of Search .............................. 429/14, 15, 17, 429/19, 20, 26, 22, 24, 12

(56) References Cited

U.S. PATENT DOCUMENTS

| | | | | |
|---|---|---|---|---|
| 5,271,916 A | | 12/1993 | Vanderborgh et al. | ...... 423/246 |
| 5,843,195 A | * | 12/1998 | Aoyama | ...................... 429/17 |
| 6,120,925 A | * | 9/2000 | Kawatsu et al. | ............... 429/26 |
| 6,156,633 A | * | 12/2000 | Pan et al. | ....................... 429/17 |
| 6,254,214 B1 | * | 7/2001 | Murthy et al. | ............... 205/764 |
| 6,254,848 B1 | * | 7/2001 | Autenrieth et al. | ....... 423/648.1 |
| 6,299,853 B1 | * | 10/2001 | Boneberg et al. | ........... 423/652 |
| 6,403,049 B1 | * | 6/2002 | Van Keulen et al. | ......... 429/12 |

FOREIGN PATENT DOCUMENTS

| | | |
|---|---|---|
| EP | 0 743 694 A1 | 4/1996 |
| EP | 0 834 948 A2 | 9/1997 |
| JP | 08106913 | 4/1996 |
| JP | 10302824 | 11/1998 |
| WO | WO 97/25752 | 7/1997 |

OTHER PUBLICATIONS

Chemical Abstracts, vol. 130,No. 3, Jan. 18, 1999; Abstract No. 27205 Hashizaki, Katsuo et al: "Carbon monoxide removing apparatus, especially for reformed gas for polymer electrolyte fuel cells" (XP002120510).
PCT International Search Report and Translation of pertinent excerpts Oct. 27, 1999.

* cited by examiner

Primary Examiner—Bruce F. Bell
(74) Attorney, Agent, or Firm—Crowell & Moring LLP

(57) ABSTRACT

A fuel cell system includes a fuel cell with a cathode space and an anode space that are separated by a polymer electrolyte membrane. The cathode space is supplied with an oxygen-containing gas, and the anode space is supplied with a hydrogen-containing gas. A gas-generation device is provided in which a hydrogen-rich reformate containing carbon monoxide, is produced from a fuel with the aid of steam reforming and/or partial oxidation. A gas-cleaning stage selectively oxidizes the carbon monoxide in the reformate on a suitable catalyst while oxygen is added; and a heat exchanger which is arranged in the gas-cleaning stage, has a cooling medium flowing through it and serves to dissipate thermal energy. According to the invention, to dissipate the thermal energy, the anode off-gas and/or cathode off-gas emerging from the fuel cell and/or a starting-material gas which is present in the fuel cell system flows through the heat exchanger.

7 Claims, 2 Drawing Sheets

FUEL CELL SYSTEM

BACKGROUND AND SUMMARY OF THE INVENTION

This application claims the priority of German patent document 198 32 389.1, filed Jul. 18, 1998 and PCT International Application No. PCT/EP99/04353, filed Jun. 23, 1999, the disclosures of which is expressly incorporated by reference herein.

The invention relates to a polymer electrolyte membrane fuel cell system.

The generation of a hydrogen-rich gas from a crude fuel for the operation of fuel cells provides a product gas with a carbon monoxide content of a few per cent. During the steam reforming of methanol, the reformate which is formed is at a temperature of, for example, approximately 300° C. Before it enters the fuel cell, the carbon monoxide concentration has to be reduced to approximately 10 ppm and the reformate has to be cooled to the operating temperature of the fuel cell, which is usually in the region of approximately 80° C. For this purpose, in conventional fuel cell systems, a gas-cleaning stage is provided between the gas-generation device and the fuel cell. Furthermore, reformate coolers are provided between the gas-generation device and the gas cleaning or between the gas-cleaning stage and the fuel cell.

European patent document EP 0 743 694 A1 discloses a fuel cell system in which a hydrogen-rich gas containing carbon monoxide is generated from a methanol/water mixture, with the aid of a reformer. The carbon monoxide is removed from the reformate in a gas-cleaning stage with the aid of selective oxidation, while oxygen is added. To cool the gas-cleaning stage, a heat exchanger is provided, which has water or oil flowing through it. A further liquid-air heat exchanger is provided for cooling the cooling medium.

Furthermore, U.S. Pat. No. 5,271,916 discloses a two-stage device for the selective oxidation of carbon monoxide in a hydrogen-rich gas mixture. This gas-cleaning stage has a heat exchanger, which preferably has a liquid cooling medium with a boiling point of between 160° and 175° C. flowing through it. Before it enters a downstream fuel cell, the gas mixture is cooled to the necessary fuel cell temperature in a further heat exchanger, which has water flowing through it.

Finally, International patent document WO 93/19005 A1 discloses a generic fuel cell system in which carbon monoxide contained in a hydrogen-rich gas mixture is selectively oxidized in a two-stage gas-cleaning stage while oxygen is being added. Heat exchangers which have a liquid flowing through them are provided in both gas-cleaning stages. In addition, a further heat exchanger is provided between the two stages.

One object of the present invention is to provide a compact fuel cell system which is inexpensive to produce and is improved in terms of the cooling of the gas-cleaning stage.

These and other objects and advantages are achieved by the fuel cell system according to the invention, in which a gas-cleaning stage is designed as a gas-gas heat exchanger that uses the anode off-gas and/or cathode off-gas from the fuel cell as a cooling medium. This configuration provides a simplified device, since there is no need for an additional coolant circuit with associated liquid/air heat exchanger. As a result, the construction space required is reduced and the costs of the device reduced.

Moreover, the inherently lower transfer of heat in gas/gas heat exchangers prevents excessive dissipation to the cooling medium. As a result, it is possible to prevent the reaction from being cooled excessively in the final gas-cleaning stage, which would make it impossible for any further oxidation to take place. (The extent of covering of the catalyst with carbon monoxide would become too high.)

Furthermore, the enthalpy flow on the cooling side (i.e., in the anode off-gas and/or cathode off-gas) is load-dependent, so that according to the heat of reaction developed during the selective oxidation, more energy is dissipated at a high load while less energy is dissipated under a low load. Moreover, the overall efficiency of the system is improved if the anode off-gas and/or cathode off-gas is fed to a downstream catalytic burner, since the anode off-gas and/or cathode off-gas is preheated as it flows through the heat exchanger. This energy then no longer has to be supplied in the catalytic burner. Overall, the cooling of the gas-cleaning stage does not cause any thermal energy to be lost to the overall system.

Furthermore, in the fuel cell system according to the invention, it is possible to dispense, inter alia, with additional reformate coolers between gas-cleaning stage and fuel cell and/or between gas-generation device and gas-cleaning stage, since the cooling medium is substantially at the operating temperature of the fuel cell. As a result, a plurality of functions are combined in a single component, so that fewer feed lines and discharge lines are required. Moreover, it is also possible to reduce the weight and space required, with an associated fall in costs.

The variation in coolant flow with the aid of a bypass line with associated bypass valve and control unit makes it possible to establish a temperature distribution in the reactor bed which is as constant as possible in terms of its dynamics, and thus to achieve a minimal CO output concentration under any load.

Other objects, advantages and novel features of the present invention will become apparent from the following detailed description of the invention when considered in conjunction with the accompanying drawings.

DETAILED DESCRIPTION OF THE DRAWINGS

Figure 1:
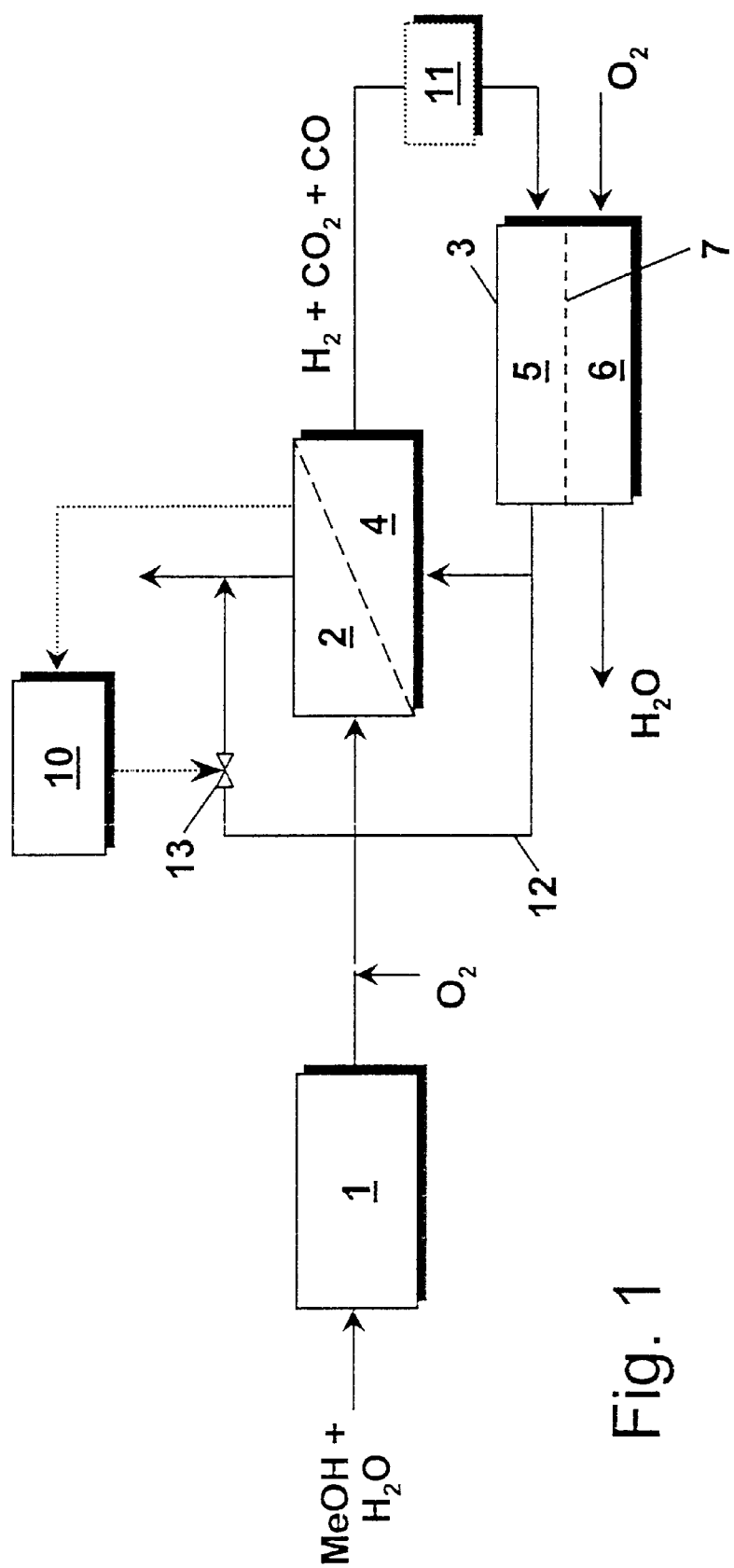
FIG. 1 shows the basic structure of a fuel cell system according to the invention having a heat exchanger with bypass line.

The fuel cell system shown in FIG. 1 includes a gas-generation device 1, a gas-cleaning stage 2 and a fuel cell 3. The fuel cell 3 includes an anode space 5 and a cathode space 6, which are separated from one another by a proton-conducting membrane 7. A hydrogen-rich gas is fed into the anode space 5, and oxygen or air is fed into the cathode space 6. On both sides, the membrane 7 is provided with a suitable catalyst. As a result, the hydrogen is oxidized in the anode, while the remaining proton can migrate through the membrane to the cathode, where the oxygen is reduced and combines with the proton to form steam. This electrochemical reaction produces a voltage which can be supplied to an external consumer.

A hydrogen-rich gas is produced from a fuel in the gas-generation device 1. This device is preferably a device for steam reforming and/or partial oxidation. Examples of fuels which can be used include methanol, benzine or other hydrocarbon-containing substances. Although the exemplary embodiment is described on the basis of the steam reforming of methanol, it is not intended that the scope of protection should be restricted to this application.

During steam reforming, a methanol/water mixture is converted on a suitable catalyst to form hydrogen and carbon dioxide. An additional by-product formed is, however, carbon monoxide. The methanol/water mixture is preferably evaporated and superheated in an evaporator unit (not shown) before it enters the gas-generation device. During the partial oxidation, oxygen is additionally added to the gas stream.

The carbon monoxide contained in the gas mixture is harmful to the fuel cell 3. For this reason, the gas-cleaning stage 2 is arranged between the gas-generation device 1 and the fuel cell 3. The gas-cleaning stage 2 reduces the level of carbon monoxide in the gas mixture to <50 ppm. In the process, the carbon monoxide is selectively oxidized on a suitable catalyst, for example platinum and/or ruthenium on a support of zeolite or alumina, with oxygen being added. In this case, as illustrated in the exemplary embodiment, the oxygen may be added to the gas mixture in suitable amounts upstream of the gas-cleaning stage 2. However, it is also possible for the oxygen to be fed directly into the gas-cleaning stage 2 at one or more points.

The maximum permissible CO entry concentration for the gas-cleaning stage 2 is very much limited by the resultant adiabatic temperature increase. Since the Lambda coefficient, i.e. the ratio of oxygen to carbon monoxide, must not be too low, a certain proportion of hydrogen is always oxidized as well as the carbon monoxide. The energy which is released in the process also contributes to the a adiabatic temperature rise. If the gas-cleaning stage 2 is n t actively cooled, the temperature rises quickly and the process takes place at a temperature level which is too high. This cause s more hydrogen and less carbon monoxide to be oxidized as the CO entry concentration rises. Therefore, the temperature must remain within a predetermined range. Partial dissipation of the h at of reaction reduces the temperature maximum, so that higher CO entry concentrations can be oxidized. The temperature control increases conversion and selectivity, while the formation o new CO is lowered as the water gas shift equilibrium is approached.

According to the invention, the gaseous cooling medium used is the anode off-gas and/or cathode off-gas or part-streams thereof. In the exemplary embodiments illustrated, the gas-cleaning stage 2 has, for example, the anode off-gas flowing through it. The use of the anode off-gas and/or cathode off-gas as cooling medium has a very large number of advantages. Firstly, there is no need to provide any additional cooling system or additional cooling medium, so that the overall system is considerably simplifier. Gas-gas heat exchangers are available components which do not require any special design and can there be produced at low cost in terms of manufacturing technology. However, according to the invention it is also possible, of course, to use gas/gas heat exchangers which are of more complex design. On the one ha d, the naturally lower heat transfer in gas/gas heat exchangers prevents the reaction from becoming excessively dependent on the cooling medium. As a result, it is possible to prevent the reaction from being cooled excessively, so that it would be impossible for any further oxidation to take place, since the extent to which the catalyst is covered with carbon monoxide would become too high.

Furthermore, the enthalpy flow on the cooling side of the gas/gas heat exchange r is load-dependent, so that, entirely according to the heat of reaction which is generated during the CO oxidation, more heat is dissipated under a high load and less heat is dissipated under a low load. Finally, the resulting preheating of the anode off-gas and/or cathode off-gas enables the overall efficiency of the system to be increased, since this energy no longer has t be generated during complete catalytic oxidation of the anode off-gas and/or cathode off-gas, which is usually connected downstream.

It is also possible to provide a drainage unit 11 between the gas-cleaning stage 2 and the fuel cell 3 for separating off condensing water. Furthermore, a bypass line 12 with associated bypass valve 13 may be provided in parallel with the heat exchanger 4. In this case, the bypass valve 13 can be arranged at any desired point i l the bypass line 12. Moreover, a control unit 10 is provided or activating the bypass valve 13. The desired bypass volumetric flow rate can be determined in the control unit on the basis of predetermined characteristic values and/or as a function f the temperature in the cooling medium and/or in the reformat and can be set by controlling the bypass valve 13. The temperature of the cooling medium or of the reformate-gas stream is measured and passed to the control unit at a suitable point in the gas-cleaning stage 2, the heat exchanger 4 and/or the associated feed lines and discharge lines.

As has already be n explained above, gas-gas heat exchangers are known, and consequently there is no need to deal with details of their structure any further in this description. The heat exchanger is preferably y formed by a plate arrangement, and the cooling medium and the reformate-gas stream preferably are guided in countercurrent. The catalyst material required for selective oxidation in the gas-cleaning stage 2 is preferably applied as a coating to a heat-ex (hanging surface in the heat exchanger 4. In this case, it is possible for the heat-exchanging surface to be entirely or only partially coated with catalyst.

Figure 2:
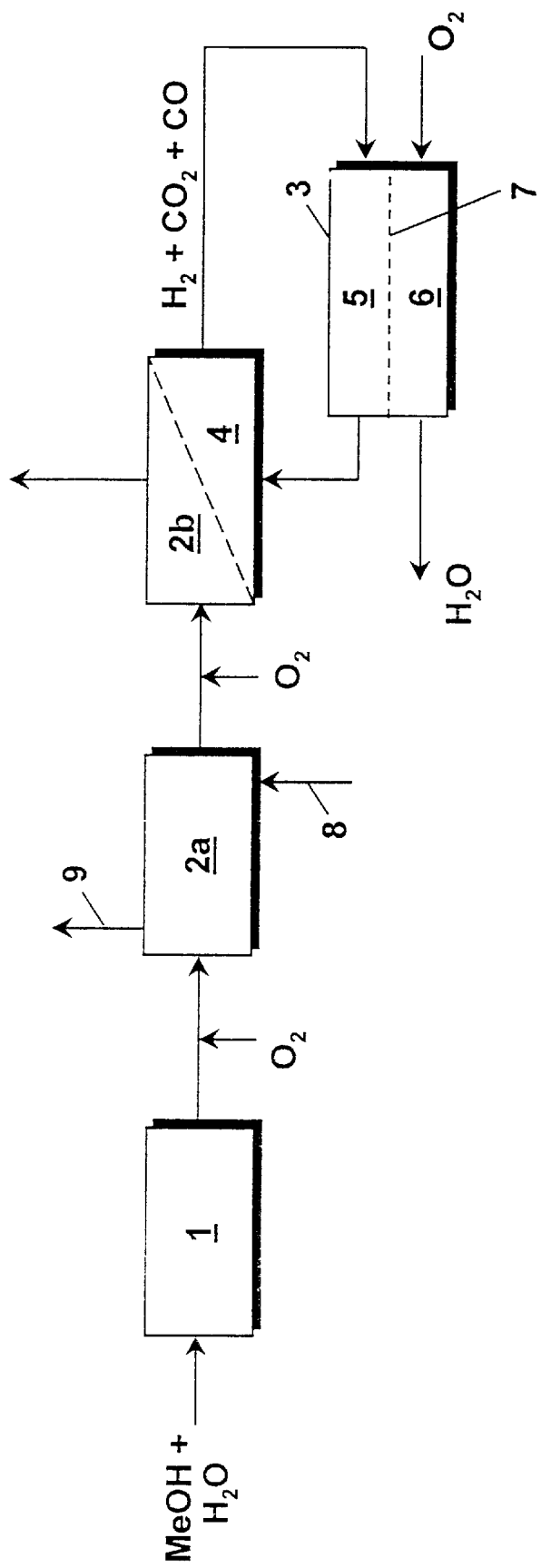
FIG. 2 shows a further exemplary embodiment having a multistage gas-cleaning stage and a heat exchanger without bypass line.

FIG. 2 shows a further exemplary embodiment, in which, compared to FIG. 1, identical parts are denoted by identical reference numerals. Unlike in FIG. 1, the gas-cleaning stage shown in FIG. 2 has a first stage 2a and a second stage 2b. (It is, of course, also possible to provide further stages.) To cool the first gas-cleaning stage 2a, it is possible for any desired cooling medium, for example a heat-transfer oil, which is supplied and discharged via corresponding feed lines and discharge lines 8, 9, to flow through the first gas-cleaning stage 2a.

In this case, as shown in the exemplary embodiment, the oxygen can be added t the gas mixture in each case in suitable amounts upstream of the respective stage 2a, 2b. However, it is also possible to feed the oxygen directly into the gas-cleaning stages 2a, 2b at one or more points. In this embodiment, unlike in FIG. 1,there is also no bypass line and also no drainage device. However, it is of course, also possible for the features from the two exemplary embodiments to be combined as desired. In addition to the arranger ent with an oil-cooled gas-cleaning stage 2a and a gas-cooled second gas-cleaning stage 2b which is shown, it is also possible for all the gas-cleaning stages 2a, 2b to be cooled with fuel cell off-gas. However, it is of controlling importance that the final stage of the gas-cleaning stage 2b be directly cooled by the fuel cell off-gas, in order to bring the reformate to the appropriate operating temperature before it enters the fuel cell 3

The foregoing disclosure has been set forth merely to illustrate the invent on and is not intended to be limiting. Since modifications of the disclosed embodiments incorporating the spirit and substance of the invention may occur to persons skilled in the art, the invention should be construed to include everything within t e scope of the appended claims and equivalents thereof.

What is claimed is:

1. A fuel cell system, comprising:
    a fuel cell having a cathode space and an anode space separated by a polymer electrolyte membrane, the cathode space being supplied with an oxygen-containing gas and the anode space being supplied with a hydrogen-containing gas;
    a gas-generation device, in which a hydrogen-rich reformate, which contains carbon monoxide, is produced from a fuel, via one of steam reforming and partial oxidation;
    a gas-cleaning stage, in which carbon monoxide in the reformate is selectively oxidized on a suitable catalyst while oxygen is being added;
    a heat exchanger arranged in the gas-cleaning stage; and
    a cooling medium flowing through the heat exchanger for dissipating thermal energy;
    wherein one of the anode off-gas and the cathode off-gas discharged from the fuel cell is used as the cooling medium in the heat exchanger.

2. The fuel cell system according to claim 1, wherein:
    the gas-cleaning stage has multiple stages; and
    the heat exchanger is assigned to at least a last gas-cleaning stage.

3. The fuel cell system according to claim 1, further comprising a bypass line for the cooling medium and an associated bypass valve arranged in parallel with the heat exchanger.

4. The fuel cell system according to claim 3, further comprising a control unit for activating the bypass valve on the basis of one of predetermined characteristic values, and function of a temperature in the coolant or in the reformate.

5. The fuel cell system according to claim 1, wherein a heat-exchanging surface in the gas-cleaning stage is at least partially coated with the catalyst for selective oxidation of the carbon monoxide.

6. The fuel cell system according to claim 1, wherein the reformate and the cooling medium are guided in counter-current in the heat exchanger.

7. The fuel cell system according to claim 1, further comprising a drainage unit arranged downstream of the gas-cleaning stage for separating off condensing water.

* * * * *